United States Patent [19]

Goodzey et al.

[11] Patent Number: 4,979,398
[45] Date of Patent: Dec. 25, 1990

[54] TORQUE MEASUREMENT CIRCUIT

[75] Inventors: Gregory P. Goodzey, South Bend; Steven R. Masteller, Mishawaka; William C. Hutter, South Bend, all of Ind.

[73] Assignee: Allied-Signal Inc., Morristown, N.J.

[21] Appl. No.: 414,795

[22] Filed: Sep. 28, 1989

[51] Int. Cl.$^5$ .............................................. G01L 3/10
[52] U.S. Cl. .................................................. 73/862.34
[58] Field of Search ........................ 73/862.34, 862.33

[56] References Cited

U.S. PATENT DOCUMENTS

| 4,183,242 | 1/1980 | Brown | 73/862.34 |
| 4,444,063 | 4/1984 | Snowden et al. | 73/862.34 |
| 4,488,443 | 12/1984 | Parkinson | 73/862.33 |
| 4,602,515 | 7/1986 | Eichenlaub | 73/862.34 |
| 4,683,746 | 8/1987 | Cullingford et al. | 73/862.34 |

Primary Examiner—Charles A. Ruehl
Attorney, Agent, or Firm—Leo H. McCormick, Jr.; Ken C. Decker

[57] ABSTRACT

A direct acting circuit through which the torque to which a shaft is being subjected is measuring without the need for divisions or other computer assisted computations. The system is self-clocking and counts speed dependent pulses generated by shaft rotation alternately in incrementing and decrementing modes with the difference being indicative of the torque. The count may be averaged over one or more complete shaft rotations to reduce or eliminate errors due to shaft or rotation sensor irregularities.

14 Claims, 4 Drawing Sheets

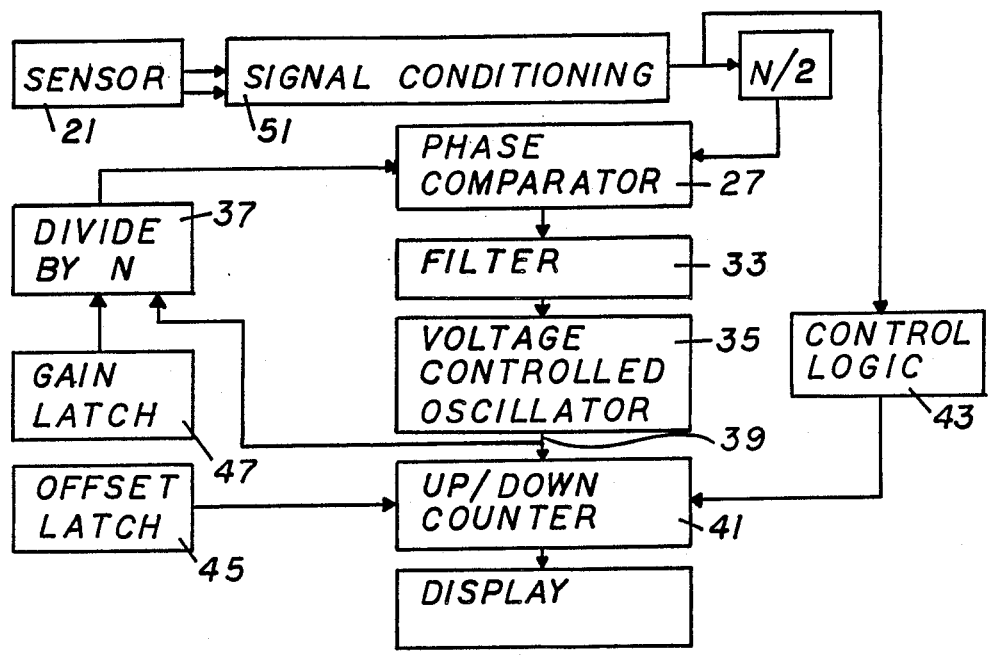
FIG. 4
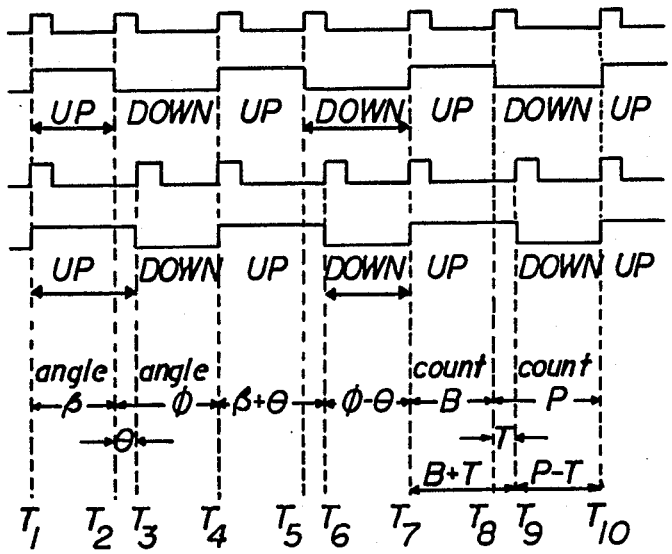

TORQUE MEASUREMENT CIRCUIT

SUMMARY OF THE INVENTION

The present invention relates generally to a method and apparatus for measuring the torque to which a shaft is subjected and more particularly to such a method and apparatus in which an indication of torque is easily attainable independent of shaft speed and without the need for any complex computation.

Among the several objects of the present invention may be noted the provision of a speed independent method of measuring shaft torque; the provision of a torque sensing transducer employing but a single monopole sensor; the provision of a torque measuring circuit suitable for use in monitoring shaft torque in helicopter, turboprop, and similar aircraft type engines; the provision of a method and apparatus for measuring the torque to which a rotating shaft is subjected which compensates for shaft irregularities; the provision of a self clocked torque monitoring device; the provision of a torque measuring circuit utilizing a phase-locked loop to provide a torque signal with a constant resolution independent of the rotational speed of the shaft from which the torque is being measured; and the provision of a torque measuring circuit using fewer components than prior art systems resulting in a smaller and less expensive circuit. These as well as other objects and advantageous features of the present invention will be in part apparent and in part pointed out hereinafter.

In general, a method of measuring the torque to which a rotating shaft is subjected includes the derivation of a first pulse train having a repetition rate which is proportional to the angular velocity of the shaft and a second pulse train also having a repetition rate proportional to the angular velocity of the shaft. Pulses of the second pulse train are interleaved with pulses of the first pulse train and delayed therefrom by an angular amount which is proportional to the torque which the shaft is currently experiencing. A first time interval between the occurrence of a pulse of the first pulse train and the next succeeding pulse of the second pulse train is timed as is a second time interval between the occurrence of said next succeeding pulse cf the second pulse train and the next succeeding pulse of the first pulse train. The time of the second time interval is subtracted from that of the first time interval to provide a value which is indicative of the shaft torque. The timing steps and the step of subtracting may be performed by incrementing a counter during the first interval and decrementing the counter during the second interval.

Also in general and in one form of the invention, a shaft torque measuring circuit is responsive to first and second pulse trains generated by the revolution of a shaft with each pulse train having a repetition rate which is proportional to the shaft angular velocity. The circuit provides an output which is indicative of the torque to which the shaft is subjected with that output being independent of shaft speed. The circuit includes a sensor which is responsive to shaft rotation for generating a composite phase modulated signal of interleaved pulses from the first and second pulse trains with the phase difference between the two component pulse trains being proportional to the torque to which the shaft is subjected. The circuit employs a phase-locked loop for providing an output pulse train the repetition rate of which is an integral multiple of the repetition rate of the composite phase modulated signal. A counter is operable on command to count pulses of the output pulse train in an incrementing mode and on further command, to count pulses of the output pulse train in a decrementing mode. The circuit further includes control circuitry which is responsive to the composite phase modulated signal for issuing commands alternately placing the counter in the incrementing and the decrementing modes. Typically the control circuit is responsive to each pulse to change from one mode to the other and to the next successive pulse to change from the other mode back to the first. An initial count or offset may be loaded into the counter after each of a fixed number (one or some integral multiple) of shaft revolutions.

BRIEF DESCRIPTION OF THE DRAWING

FIG. 4 is a schematic block diagram of circuitry responsive to the transducer of FIGS. 1 and 2 to provide a torque angle indication;

FIGS. 5a–5d illustrate no-torque and torque waveforms helpful in understanding the circuit of FIG. 4;

Corresponding reference characters indicate corresponding parts throughout the several views of the drawings.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
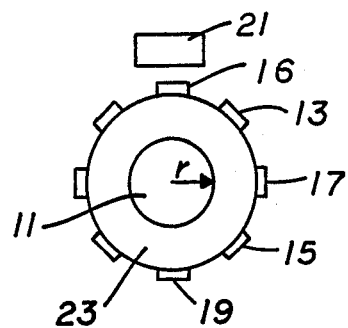
FIG. 1 is an end view of the shaft portion and juxatposed monopole sensor of a torque sensing transducer.

Generally speaking, a shaft is subjected to a torque during acceleration or while transmitting energy even at a constant angular velocity. The torque measuring arrangement of FIGS. 1 and 2 utilizes a section of the shaft 11 of length 10 which section is twisted by the torque experienced by the shaft 11. The section 10 has a series of teeth such as 13 end 15 near one end on a rim 23 and additional teeth such as 16, 17 and 19 supported on an annulus 25 which is fixed to the shaft near the other end of the section. Thus, alternate teeth are fixed to portions of the shaft which are separated by the distance 10 yet the annulus or hollow cylindrical member 25 is effective to position those teeth close to one another. Such an arrangement is known in the art as a "torque tube". The teeth provide some sort of record of their passage and could, for example, be magnetic poles which function to close the contacts of a normally open reed switch when they pass in close proximity to that switch. In the preferred form, the teeth are ferromagnetic proturbulences which are effective to change the reluctance of the magnetic circuit associated with sensing coil 21 as they rotate pass that sensing coil. Optical sensing schemes as well as other sensing devices for deriving a series of interleaved pulses alternate ones of which are associated with the respective alternate ends of a section of the shaft 11 also may be used.

Figure 3A:
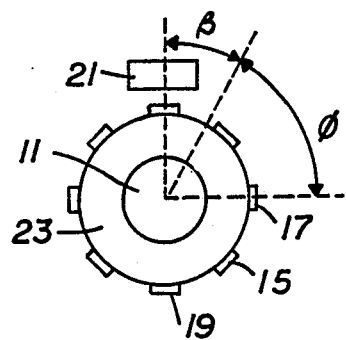
FIGS. 3a and 3b are geometric representations similar to FIG. 1 explaining torque angle computation.
Figure 3B:
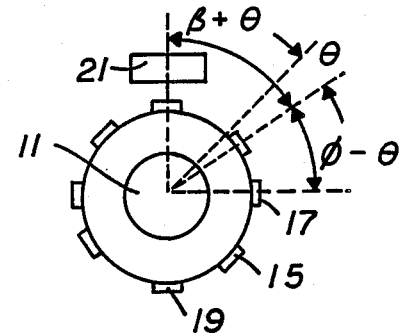

When the shaft section 11 is subjected to a torque, the relative angular orientation of the teeth supported near one shaft section end changes with respect to those supported at the other end. Thus, there is either a precession or a recession by an angle $\theta$ of alternate ones of the teeth relative to the other intermediate teeth when torque is applied to the shaft 11. FIG. 3a depicts the no torque condition while FIG. 3b shows torque induced twisting of the shaft section 10 by the angle $\theta$. This angular deviation or twist $\theta$ is related to the actual shaft torque t in inch pounds by the relationship:

$$t = \theta \pi r^2 G / 2l$$

where G is the modulus of elasticity in shear in pounds per square inch and the radius r and length 10 are in inches. Thus, all the parameters are known properties of the shaft section 10 and, within the elastic limits of the shaft section 10, the actual torque t and the torque angle $\theta$ are directly proportional and related by a constant ($\pi r^2 G / 2l$) which is known to the designers. Hence, for a given transducer and shaft configuration, measurements of the torque angle or twist differ from measurements of the actual torque by a known constant and the determination of one provides an immediate indication of the other.

A single sensor, such as a normally open reed switch or the variable reluctance sensing coil 21, is positioned near the teeth and senses the passage of each of the teeth to produce a series of pulses. As illustrated, there are four equiangularly spaced teeth at each end of the shaft section and the teeth at one shaft end are offset form the teeth at the other end. In general, consecutive teeth at either end will be equiangularly separated by ↑ +$\phi$ degrees while consecutive teeth as seen by the sensor (one associated with each end) are separated by a no-torque angle of $\beta$ followed by a separation between the next consecutive pair of $\phi$ degrees. It will be noted that every pair of pulses or switch closures generated by the teeth such as 13 and 15 associated with the one shaft end is separated by a pulse generated by a tooth such as 17 indicative of the position of the other end of the shaft. Furthermore, shaft torsion (twisting) delays the pulses corresponding to one shaft end relative to the pulses generated by the teeth at the opposite end and this delay or increase of $\theta$ in one angle ($\beta$ or $\phi$ depending on the direction of twist) between consecutive teeth and decrease by $\theta$ in the next subsequent angle (the other of $\beta$ or $\phi$) between consecutive teeth provides a measure of the torsion to which the shaft is subjected. Resolution of the direction of applied torque is materially aided if the angle $\beta$ is selected so that $\beta + \theta \neq \phi + \theta$ at any torque magnitude.

In FIG. 3a, the angle $\beta + \phi$ is an arbitrary angle between a pair of radially adjacent teeth associated with the same shaft end (45 degrees in the case of the four teeth shown). One of the teeth at the opposite end is positioned between these two teeth and spaced from one of them by the angle $\beta$ as shown when the shaft section is not subjected to any torque. Thus the no-torque angle between adjacent teeth (one associated with each shaft end) which actuates the switch 21, i.e., the angle between adjacent pulses generated by the switch is alternately $\beta$ and $\phi$. As the shaft experiences increasing torsion, the poles 17 and 19 move, for example, clockwise as illustrated in FIG. 3b, so that the angle $\beta$ between poles 13 and 17 becomes greater by an angular increment $\theta$ while the angle between poles 15 and 17 is decreased by the angle $\theta$. A stopwatch or other timing or uniform counting scheme may be employed to measure the time it takes for the stressed shaft to rotate from pole to pole and the difference between two consecutive time intervals provides a measure to the angle t. This measure is, however, speed dependent. To normalize this measure, it may be divided by the sum of the two consecutive time intervals and to obtain an actual angular measure, the ratio of the time difference to the time sum is multiplied by the angle $\frac{1}{2}(\beta + \phi)$. The normalization of this indication is that it is independent of shaft angular velocity without the need for, nor the expense of the circuitry for performing these computations may be accomplished by utilizing speed dependent "timing" pulses as illustrated in FIG. 4.

Figure 2:
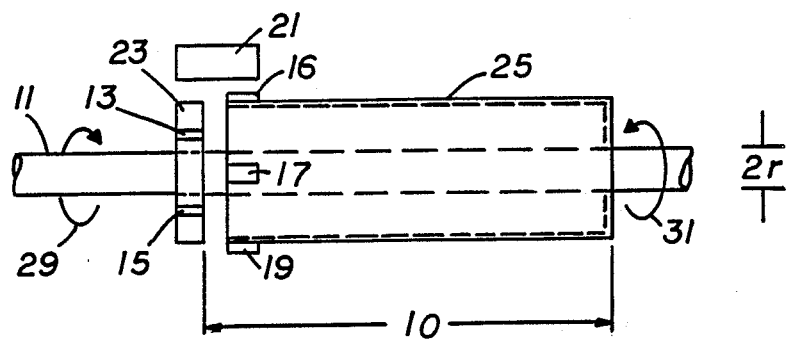
FIG. 2 is a side view of the shaft portion and sensor of the torque sensing transducer of FIG. 1.

In FIG. 4, the pulse train of FIG. 5a (no-torque) or 5c (exemplary torsion in the direction of the arrows 29 and 31 in FIG. 2) is supplied from the monopole reluctance sensor 21 to a phase comparator 27. To eliminate phase modulation in the input signal supplied to phase comparator 27, the input signal due to the difference between B and $\phi$ as shown in FIG. 5a or between B+$\phi$ and $\phi + \theta$ in FIG. 5c is divided by $\frac{1}{2}$. The phase comparator 27 along with filter 33 and a voltage controlled oscillator 35 are connected together as a phase-locked loop with the feedback being by way of a divide by N counter 37. Such division by N in the feedback loop effectively causes the phase-locked loop to multiply the input frequency by N while the filter 33 is effective to eliminate noise. Hence, the output on line 39 to the counter 41 is a uniform pulse train having a repetition rate of N times the repetition rate of $\frac{1}{2}$ the FIG. 5a or FIG. 5c waveforms, i.e., NK pulses per shaft revolution where K is the number of teeth per end (K=4, in the illustrated embodiment), or NKW hertz where W is the angular velocity of the shaft in revolutions per second. For the illustrated four teeth on each end, the input to counter is a shaft speed dependent signal of 4NW hertz. The control logic circuit 43 responds to each pulse of the pulse train shown in FIG. 5a or 5c to reverse the direction in which the counter 41 is counting, i.e., it reverses between the incrementing and decrementing. By selecting $\beta$ and $\theta$ unequal, the control logic is also capable of sensing an overflow from the counter 41 which indicates hat the roles of "up" and "down" are reversed and can remedy that situation. By selecting B+$\theta$ at an angle which is less than 180 electrical degrees, the phase angle, either + or − is always known. The control logic is also effective to latch, clear and restart the counting after each complete revolution. This averaging over a complete revolution eliminates many tolerance errors.

As a specific example, suppose a no-torque condition with $\beta < 0$, i.e., P>B. Over a complete revolution counter 41 will accumulate 4B−4P<0 as a count. By preloading an offset value $\mu = 4P - 4B > 0$ into the counter, the final count at the end of each revolution will be 0 indicating the no-torque ($\theta = 0$) condition. The offset latch 45 preloads this value $\mu$ (which is programmably selectable to match the circuit to a particular shaft) into the counter 41 at the beginning of each revolution. When the shaft is subjected to torque, the counter accumulates 4(B+T)−4(P−T)+μ=4B−4P+8Tμ=4B−4P+8T−+4P−4B=8T each revolution. From the proportion NK/360=T/θ the value V in the counter at the end of each complete shaft revolution is related to θ the actual angular shaft strain by the formula θ= (V/8)(360/2NK). If NK=45, the value in counter 41 which is displayed by display unit 49 will numerically be the angular shaft strain in degrees, however, it has been found to be more practical to select N to be on the order of 1,500 to get a sufficient number of counts for adequately fine resolution and then to rescale the result in the counter as needed to be sent to and displayed by display 49. The value of N is programmably selectable via gain latch 47 to match the circuit to a given shaft installation.

Figure 6:
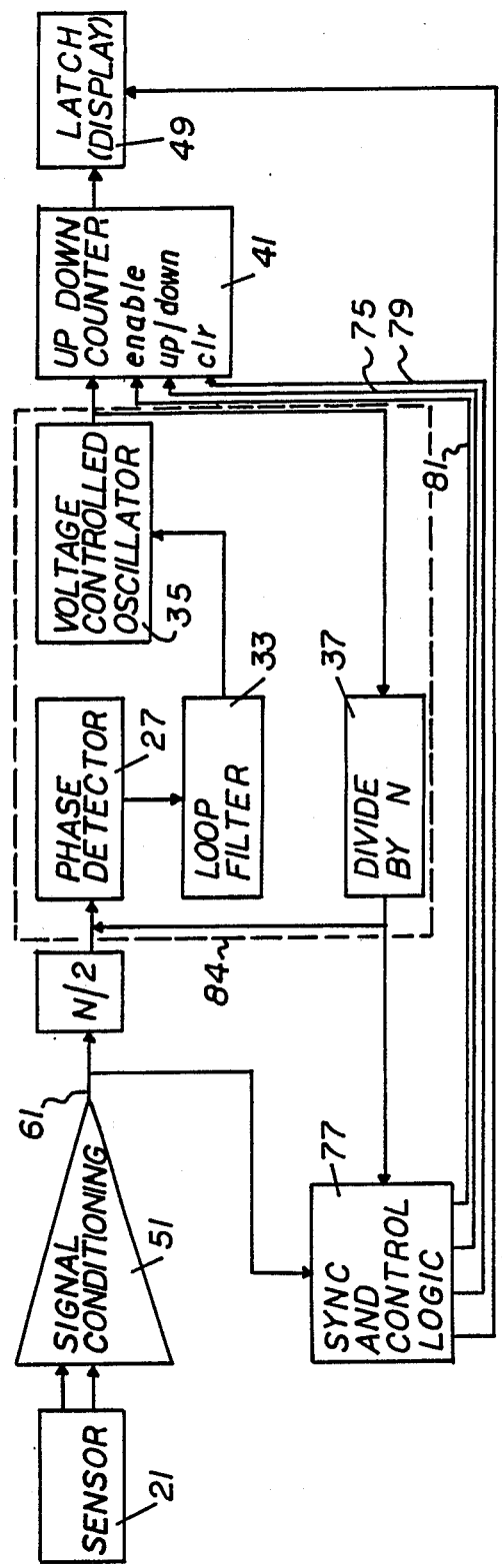
FIG. 6 is a schematic diagram of a torque measurement circuit differing somewhat from the circuit of FIG. 4.

FIG. 6 is a somewhat more detailed block diagram for a circuit similar to the one described in FIG. 4, but lacking the versatility of selecting the numerical value of N (N is fixed at 1,500) and lacking the versatility of programmably setting the offset value μ. Similar component blacks in FIGS. 4 and 6 are identified by like reference numerals. The signal conditioning circuit 51 of FIG. 6 is shown in greater detail in FIG. 7. The input signal is connected to a monopole pickup sensor 21 and provides for common and differential mode filtering. Further, a zero crossover detector 86 is included in this signal conditioning circuit 51 along with a digital pulse filter 88 to condition the output signal 61 going to the phase-phase locked loop portion 84 of the circuit.

Figure 7:
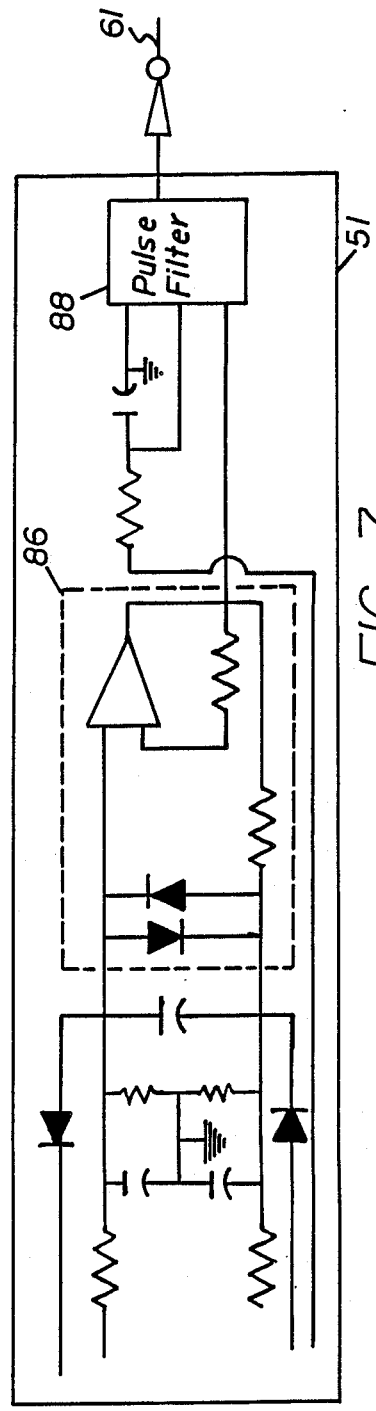
FIG. 7 is a more detailed schematic diagram of a signal conditioning circuit suitable for use into the circuit of FIG. 6.
Figure 8:
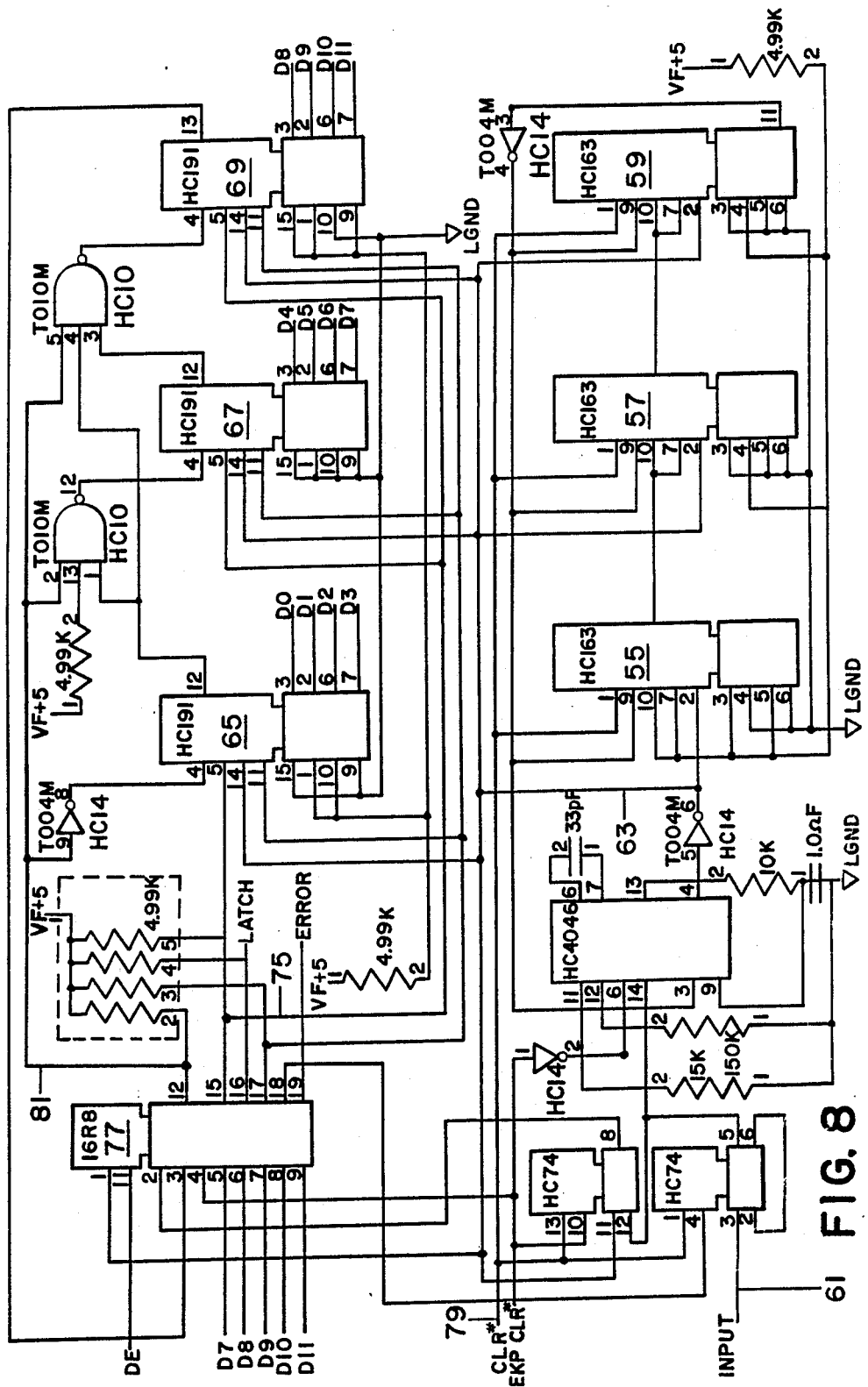
FIG. 8 is a more detailed schematic diagram of a phase-locked loop and divider circuit suitable for use in the circuit of FIG. 6.

The phase-locked loop portion 84 of the circuit of FIG. 6 illustrated in FIG. 8 uses a commercially available integrated circuit 53 such as a type HC4046, available for RCA and National Semiconductor for the phase detector 27, loop filter 33 and voltage controlled oscillator 35. The divide by N circuit is implemented on HC163 type counter 37, also available from RCA and National Semiconductor, associated with integrated circuits 55, 57 and 59. The output signal on line 61 in FIG. 7 is the input on the like numbered line in FIG. 8.

FIG. 8, the actual counter is implemented on the three chips 65, 67 and 69 which receive the up or down instruction from the synchronization and control logic block 77 of FIG. 6 on line 75 and the counter enable signal on line 81. The outputs on these counter chips are coupled to the display drivers 71 and 73. These chips are cleared at the time the power is turned on by a power up clear signal on line 79 from control logic circuit 77.

From the foregoing, it is now apparent that a novel arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A method of measuring the torque to which a rotating shaft is subjected comprising the steps of:
    deriving a first pulse train the repetition rate of which is proportional to the angular velocity of the shaft;
    deriving a second pulse train the repetition rate of which is also proportional to the angular velocity of the shaft, pulses of the second pulse train being interleaved with pulses of the first pulse train and delayed therefrom by an amount proportional to the torque which the shaft is experiencing;
    timing a first time interval between the occurrence of a pulse of the first pulse train and the next succeeding pulse of the second pulse train;
    timing a second time interval between the occurrence of said next succeeding pulse of the second pulse train and the next succeeding pulse of the first pulse train;
    subtracting the time of the second time interval from that of the first time interval to obtain a phase difference, said phase difference being a value which is indicative of shaft torque.

2. The method of claim 1 wherein the timing steps and the step of subtracting include:
    incrementing a counter during the first interval; and
    decrementing the counter during the second interval.

3. The method of c)aim 2 including the further steps of:
    repeating the incrementing and decrementing a sufficient number of times to average the torque over at least one complete shaft revolution.

4. The method of claim 1 further including the further step of:
    normalizing the shaft torque indicative value to provide a further torque value which is independent of shaft angular velocity.

5. The method of claim 4 wherein the step of normalizing includes the step of:
    generating a signal the repetition rate of which is an integral multiple of the shaft angular velocity in revolutions per second and counting the repetitions of the generated signal, the timing steps and step of subtracting including increasing the count of the repetitions during the first interval and decrementing the count during the second interval.

6. The method of claim 5 including the further steps of:
    repeating the increasing and decrementing of the count a sufficient number of times to average the torque over at least one complete shaft revolution.

7. The method of claim 5 wherein the generating step includes the step of;
    combining the first and second pulse trains to form a third pulse train;
    generating a further signal the repetition rate of which is an integral multiple to the repetition rate of the third pulse train.

8. The method of claim 7 wherein the repetition rate of the third pulse train is double the repetition rate of the first pulse train.

9. The method of claim 8 further including the step of;
    evaluating the phase difference to determine the actual angular direction of the torque.

10. A circuit responsive to first and second pulse trains generated by the revolution of a shaft where each pulse train has a repetition rate which is proportional to shaft angular velocity for providing an output indicative of the torque to which the shaft is subjected which output is independent of shaft speed comprising:
    a sensor responsive to shaft rotation for generating a composite phase modulated signal of interleaved pulses from the first and second pulse trains with the phase difference between the two component pulse trains being proportional to the torque to which the shaft is subjected;
    a phase-locked loop for providing an output pulse train the repetition rate of which is an integral multiple of the repetition rate of the composite phase modulated signal;

a counter operable on command to count pulses of the output pulse train in an incrementing mode and on further command, to count pulses of the output pulse train in a decrementing mode;

control means responsive to the composite phase modulated signal for issuing commands alternately placing the counter in the incrementing and the decrementing modes; and means for loading ar initial count into the counter after each of a fixed number, of shaft revolutions.

11. The circuit of claim 10 wherein the control means is responsive to each Pulse to change from one mode to the other and to the next successive pulse to change from the other mode back to the first.

12. The circuit of claim 10 further comprising:
means for modifying the particular integer multiple of the repetition rate of the phase modulated signal which gives repetition rate of the output pulse train.

13. The circuit of claim 10 wherein the fixed number is one.

14. The circuit of claim 13 further comprising:
mean for determining the absolute value of the phase difference to determine the actual angular direction of the torque.

* * * * *